United States Patent [19]
Lichter

[11] Patent Number: 5,465,813
[45] Date of Patent: Nov. 14, 1995

[54] BRAKE UNIT

[75] Inventor: Nicholas J. Lichter, Kenosha, Wis.

[73] Assignee: ATC Leasing Company, Kenosha, Wis.

[21] Appl. No.: 331,163

[22] Filed: Oct. 28, 1994

Related U.S. Application Data

[63] Continuation of Ser. No. 121,551, Sep. 16, 1993, abandoned.

[51] Int. Cl.$^6$ ........................................................ B60T 7/02
[52] U.S. Cl. ...................... 188/3 H; 188/112 R; 188/170; 303/7; 303/9.76; 303/49; 303/71
[58] Field of Search ........................ 188/3 H, 3 R, 188/112 R, 170, 345, 152, 151 A, 2 R, 112 A, 10, 265, 353; 303/48, 49, 7–9, 13–14, 47, 2–3, 71, 9.76, 6.01, 18; 180/244; 280/428, 446.1

[56] References Cited

U.S. PATENT DOCUMENTS

| | | | |
|---|---|---|---|
| 1,986,799 | 1/1935 | Dickey | 188/3 H |
| 2,126,849 | 8/1938 | Weiss | 188/170 |
| 2,177,469 | 10/1939 | White | 303/49 |
| 2,711,228 | 6/1955 | Shank | 188/3 H |
| 3,285,672 | 11/1966 | Avrea | 303/71 |
| 3,318,422 | 5/1967 | Frescura | 188/2 R |
| 3,411,833 | 11/1968 | Alfieri | 303/7 |
| 3,736,842 | 6/1973 | Valentine | 303/71 |
| 4,398,771 | 8/1983 | McCurry et al. | 303/7 |
| 4,635,758 | 1/1987 | Beard, Jr. | 303/49 |
| 4,756,390 | 7/1988 | Meadows | 303/49 |
| 5,031,729 | 7/1991 | Wittkop et al. | 188/112 R |
| 5,195,768 | 3/1993 | Hendrix | 188/112 R |

*Primary Examiner*—Douglas C. Butler
*Attorney, Agent, or Firm*—Reinhart, Boerner, Van Deuren, Norris & Rieselbach

[57] ABSTRACT

A device for applying the brake of a towed vehicle when towed by a towing vehicle equipped with an air brake system having a power brake operator operative to supply operating air under pressure to apply a brake on the towing vehicle and also having a reservoir of operating air under pressure. The device is connected to the brake pedal of the towed vehicle. It comprises a first piston-cylinder assembly with a spring for urging the piston therein to an advanced position, and a second piston-cylinder assembly having a spring urging the piston therein to a retracted position. The brake on the towed vehicle is applied only when one of the pistons is advanced. An air line supplies air from the reservoir to the first piston-cylinder assembly to urge the piston to a retracted position against the action of the spring. The brake of the towed vehicle is applied when the piston in the first piston-cylinder assembly is moved to an advanced position by the spring therein in response to a loss of pressure in the reservoir. The brake of the towed vehicle is also applied when the piston in the second piston-cylinder assembly is moved against the spring force to its advanced position by operating air under pressure from the power brake operator when the power brake operator applies the brakes of the towing vehicle.

2 Claims, 2 Drawing Sheets

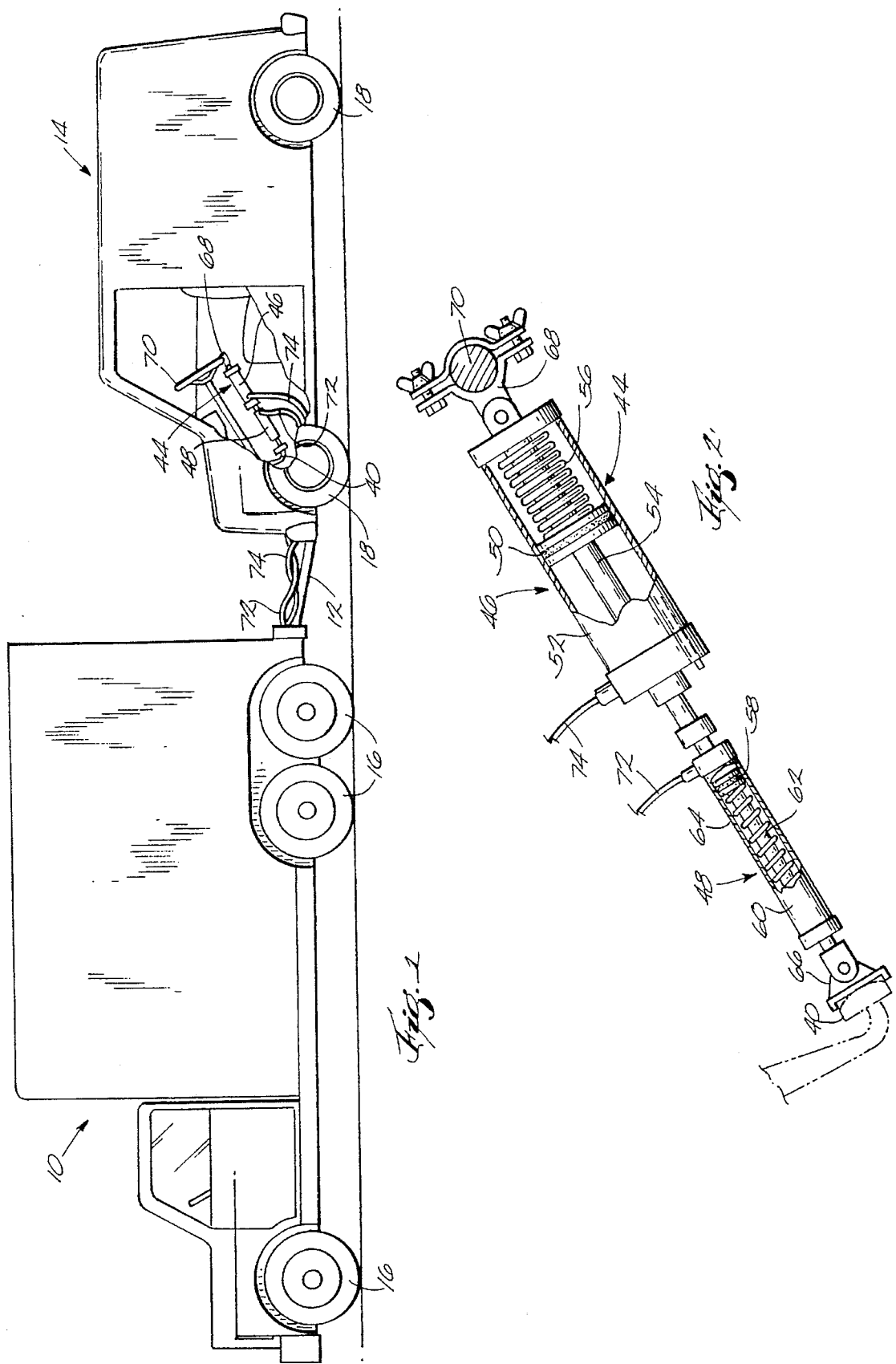

5,465,813

BRAKE UNIT

This is a continuation of application Ser. No. 08/121,551 filed on Sep. 16, 1993, now abandoned.

This invention relates generally to a device for applying the brakes of a towed vehicle.

SUMMARY OF THE INVENTION

The device of this invention is operative to apply the brakes of a towed vehicle when the brakes of the towing vehicle are applied and also when there is a complete failure of the brake system of the towing vehicle.

The invention is adapted for use with a towing vehicle equipped with an air brake system having a power brake operator operative when actuated to supply operating air under pressure to apply the brakes of a towing vehicle and also having a reservoir of operating air under pressure. The device of this invention applies the brakes of the towed vehicle and comprises first and second piston-cylinder assemblies, one having a spring urging the piston to an advanced position and the other having a spring urging the piston to a retracted position. Air from the reservoir subjects the piston in the first piston-cylinder assembly to reservoir air pressure, moving the piston therein to a retracted position against the action of the spring. Air from the power brake operator of the towing vehicle subjects the piston in the second cylinder to operating air under pressure when the power brake operator is actuated to move the piston in the second cylinder to its advanced position against the action of the spring.

The brakes of the towed vehicle are applied when the piston in the first piston-cylinder assembly is moved to its advanced position by the spring in the response to the loss of pressure in the reservoir. The brakes of the towed vehicle are also applied when the piston of the second piston-cylinder assembly is moved to its advanced position by operating air under pressure in response to actuation of the power brake operator.

Preferably the two piston-cylinder assemblies of this invention are aligned and connected end-to-end, with one end of the assemblies connected to the steering wheel and the other end of the other assembly connected to the brake pedal of the towed vehicle.

This invention is particularly useful when the towed vehicle is equipped with brakes which are other than air brakes, typically hydraulic or electric over hydraulic brakes.

One object of this invention is to provide a device for applying the brakes of a towed vehicle having the foregoing features.

Another object is to provide a device for applying the brakes of a towed vehicle which is of relatively simple construction, rugged and dependable in operation, and composed of a relatively few simple parts capable of being readily assembled and installed.

Other objects, features and advantages of the invention will become more apparent as the following description proceeds, especially when considered with the accompanying drawings.

BRIEF DESCRIPTION OF THE DRAWINGS

FIG. 1 is a semi-diagrammatic side elevational view showing one truck towing another, the towed truck being equipped with the device of this invention.

FIG. 2 is an enlarged elevational view with parts broken away and in section, of the device of this invention.

DETAILED DESCRIPTION

Figure 3:
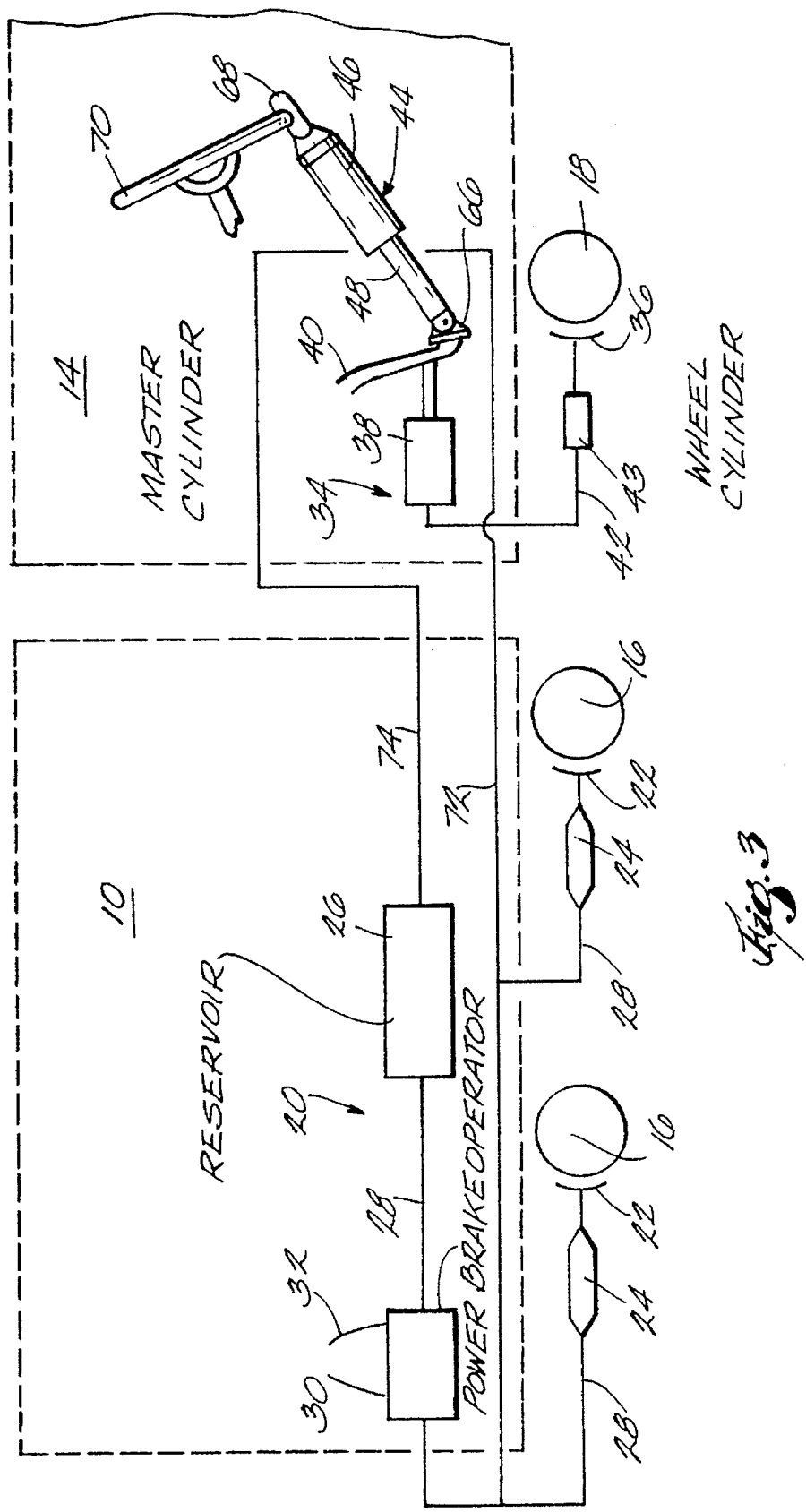
FIG. 3 is a diagrammatic view showing the manner in which the device of this invention is hooked up to the power brake operator and reservoir of the towing truck.

Referring now more particularly to the drawings, the truck 10 (towing vehicle) is connected to a truck 14 (towed vehicle) by a tow bar 12. Truck 10 is supported on wheels 16 and truck 14 is supported on wheels 18.

The truck 10 has an air brake system 20, including wheel brakes 22 for the respective wheels 16. The brakes 22 are applied by the diaphragms 24. A reservoir 26 for air under pressure is mounted on truck 10. An air line 28 from the reservoir 26 leads to the diaphragms. A power brake operator or valve 30 in air line 28 is normally closed, to block the diaphragms 24 from communication with the reservoir. When the brake pedal 32 is depressed, it opens valve 30 and air under pressure from the reservoir 26 is delivered to diaphragms 24, thereby actuating the diaphragms and applying the brakes.

The truck 14 has a brake system 34 which usually, but not necessarily, is not of the type operated by air under pressure. In this instance, the brake system 34 is a hydraulic system. The brake system 34 has brakes 36 for the individual wheels 18. A master cylinder 38 is operated by a brake pedal 40 to deliver hydraulic fluid through line 42 to the wheel cylinders 43 of the respective brakes 36 when pedal 40 is depressed, to apply the brakes.

The device 44 in truck 14 is designed to depress the brake pedal 40 and apply the brakes 36 - 1) when the brakes of the air brake system 20 of truck 10 are applied or 2) when there is a substantial or complete loss of air pressure in the reservoir 26 of truck 10.

The device 44 includes two piston-cylinder assemblies 46 and 48. Piston-cylinder assembly 46 comprises a piston 50 reciprocable within a cylinder 52, and a piston rod 54 extending from the piston 50 through the rod end of the cylinder 52. A coil spring 56 is compressed between piston 50 and the head end of cylinder 52.

Piston-cylinder assembly 48 comprises a piston 58 reciprocable within a cylinder 60, and a piston rod 62 extending from piston 58 through the rod end of cylinder 60. A coil spring 64 is compressed between the piston 58 and the rod end of cylinder 60.

The piston-cylinder assemblies 46 and 48 are connected together in end-to-end alignment. The rod 54 of piston-cylinder assembly 46 is rigidly connected to the head end of cylinder 60 of piston-cylinder assembly 48, and the rod 62 of piston-cylinder assembly 48 is pivoted to a shoe 66 which is releasably secured to brake pedal 40 of truck 14. The head end of cylinder 52 has a pivotal bracket 68 releasably secured to the steering wheel 70 of truck 14.

An air line 72 leads from the air line 28 to the head end of cylinder 60 of piston-cylinder assembly 48. During the time when the two vehicles are proceeding along the highway and the brakes are not used, there is no air pressure in air lines 28 and 72 and hence the compressed spring 64 moves the piston 58 to the head end of cylinder 60. Thus reduces the overall length of the piston-cylinder assembly 48 and the brakes 36 of truck 14 are not applied.

An air line 74 leads from the reservoir 26 to the rod end of cylinder 52 of piston-cylinder assembly 46. When there is the normal amount of air pressure in reservoir 26, this pressure is transmitted to the rod end of cylinder 52, moving piston 50 to the head end of the cylinder 52 against the force of spring 56. This reduces the overall length of the piston-cylinder assembly 46 and the brakes 36 of truck 14 are not applied.

When brake pedal 32 is depressed, valve 30 opens and air under pressure is delivered through air line 28 to the diaphragms 24, applying the brakes of truck 10. At the same time, air pressure in air line 28 is transmitted via line 72 to the head end of the cylinder 60 of piston-cylinder 48, moving the piston 58 to the rod end of cylinder 60 against the force of spring 64. This extends the overall length of piston-cylinder assembly 48 and depresses the brake pedal 40 to operate master cylinder 38 and apply the brakes of truck 14.

If there should be a complete loss of pressure in reservoir 26, the air system on truck 10 cannot apply the brakes of truck 10. This loss of pressure in the reservoir also causes a loss of pressure in line 74 to the cylinder 52 of piston-cylinder assembly 46 so that the compressed spring 56 will move the piston 50 to the rod end of the cylinder 52, thereby extending the overall length of the piston-cylinder assembly 46 and depressing brake pedal 40 to operate master cylinder 38 and apply the brakes of the truck 14. The same result will follow a substantial, if not total, loss of reservoir air pressure.

What is claimed is:

1. A device for use in connection with a towing vehicle and a towed vehicle wherein the towed vehicle includes a brake pedal and wherein the towing vehicle includes an air brake system having a brake, a reservoir of compressed air, and a power brake operator operable to supply compressed air from the reservoir to the brake of the towing vehicle, said device comprising:

a first piston-cylinder assembly having a first piston reciprocable within a first cylinder member and a first piston rod member extending from said first piston beyond an end of said first cylinder member;

a first spring urging said first piston rod member in a direction to extend the length of said first piston-cylinder assembly;

a second piston-cylinder assembly having a second piston reciprocable within a second cylinder member and a second piston rod member extending from said second piston beyond an end of said second cylinder member;

a second spring urging said second piston rod member in a direction to reduce the length of said second piston-cylinder assembly;

said first and second piston-cylinder assemblies being aligned and connected together end to end;

a first air line adapted to lead from the reservoir of compressed air to said first cylinder member to subject said first piston therein to reservoir air pressure and thereby move said first piston in a direction to reduce the overall length of said first piston-cylinder assembly against the action of said first spring;

a second air line adapted to lead from said power brake operator to said second cylinder member to subject said second piston therein to operating air under pressure when said power brake operator is actuated and thereby move said second piston in a direction to extend the overall length of said second piston-cylinder assembly against the action of said second spring;

the remote ends of said piston-cylinder assemblies being connectable respectively to the brake pedal of the towed vehicle and to a relatively fixed support on said towed vehicle so that said first piston-cylinder assembly is extended by said first spring in response to a loss of pressure in the reservoir and said second piston-cylinder assembly is extended by operating air under pressure in response to actuation of the power brake operator so that the brake pedal of the towed vehicle is depressed in response to either a loss of pressure in the reservoir or to actuation of the power brake operator.

2. A brake pedal actuator as defined in claim 1 wherein the relatively fixed support comprises the steering wheel of the towed vehicle.

\* \* \* \* \*